(12) United States Patent
Kuga et al.

(10) Patent No.: US 8,238,600 B2
(45) Date of Patent: Aug. 7, 2012

(54) ELECTRONIC WATERMARK EMBEDDING APPARATUS FOR SELECTIVELY EMBEDDING ELECTRONIC WATERMARK INFORMATION IN DIFFERENT FREQUENCY COMPONENTS OF IMAGE DATA AND ELECTRONIC WATERMARK EMBEDDING METHOD

(75) Inventors: Takeshi Kuga, Kawasaki (JP); Shigeru Fujita, Yokohama (JP); Hiroki Horikoshi, Komae (JP); Akira Ichimura, Tokyo (JP); Hideki Takemura, Tokyo (JP); Hiroyuki Hosogoshi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 993 days.

(21) Appl. No.: 12/233,096

(22) Filed: Sep. 18, 2008

(65) Prior Publication Data

US 2009/0080693 A1    Mar. 26, 2009

(30) Foreign Application Priority Data

Sep. 21, 2007  (JP) .................................. 2007-244939

(51) Int. Cl.
*G06K 9/00* (2006.01)
(52) U.S. Cl. ...................................................... 382/100
(58) Field of Classification Search .................. 382/100, 382/232–253; 380/200–242; 358/426.01–426.16; 354/55; 348/384.1–440.1; 375/122, 240.01–240.29
See application file for complete search history.

(56) References Cited

U.S. PATENT DOCUMENTS

| | | | |
|---|---|---|---|
| 5,930,369 A | 7/1999 | Cox et al. | 380/54 |
| 6,208,735 B1 | 3/2001 | Cox et al. | 380/54 |
| 6,298,142 B1 * | 10/2001 | Nakano et al. | 382/100 |
| 2005/0025338 A1 * | 2/2005 | Zhao et al. | 382/100 |
| 2008/0025564 A1 * | 1/2008 | Kim et al. | 382/100 |

FOREIGN PATENT DOCUMENTS

| | | |
|---|---|---|
| AU | 701639 | 4/1997 |
| EP | 0 766 468 | 3/2006 |
| JP | 9-191394 | 7/1997 |

* cited by examiner

*Primary Examiner* — Atiba O Fitzpatrick
(74) *Attorney, Agent, or Firm* — Fitzpatrick, Cella, Harper & Scinto

(57) ABSTRACT

An electronic watermark embedding apparatus and an electronic watermark embedding method can severally deal with both of the resistance property of an electronic watermark and the prevention of image quality deterioration. Electronic watermark information of a high importance level is embedded in a component having a strong resistance property, and electronic watermark information of a low importance level is embedded in a component exerting little influence on an image quality. As a result, the electronic watermark information to be embedded in the component having a strong resistance property is limited to that of a high importance level. Moreover, the image quality deterioration can be suppressed in comparison with the case of embedding all pieces of information, and the electronic watermark information of low importance level is embedded in the component having a weak resistance property but exerting little influence on an image quality.

12 Claims, 11 Drawing Sheets

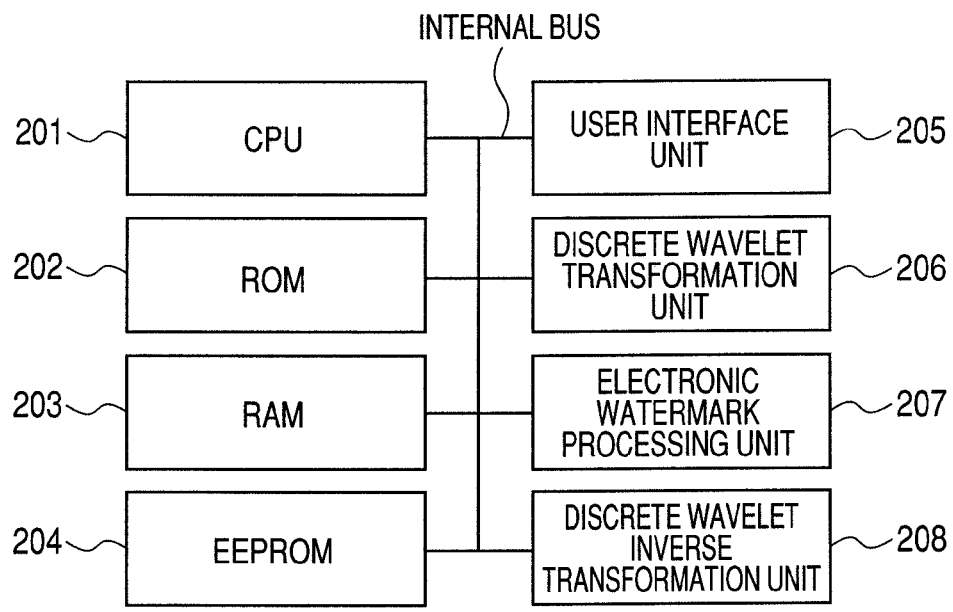
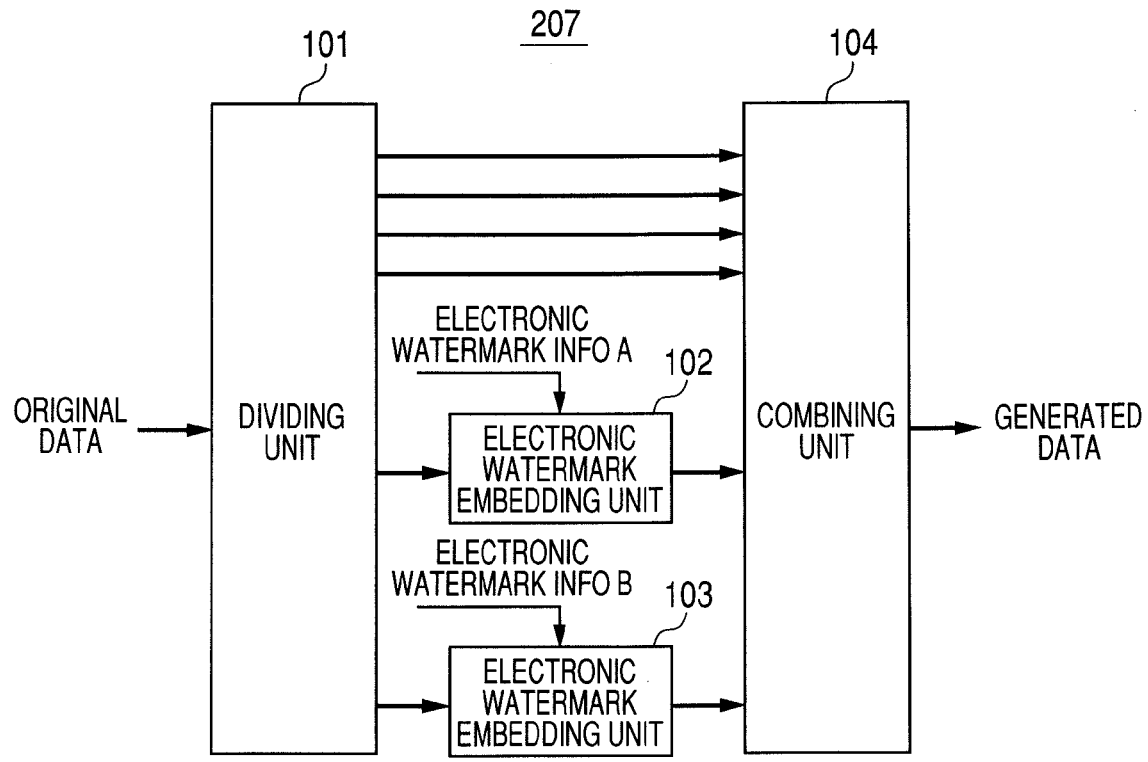

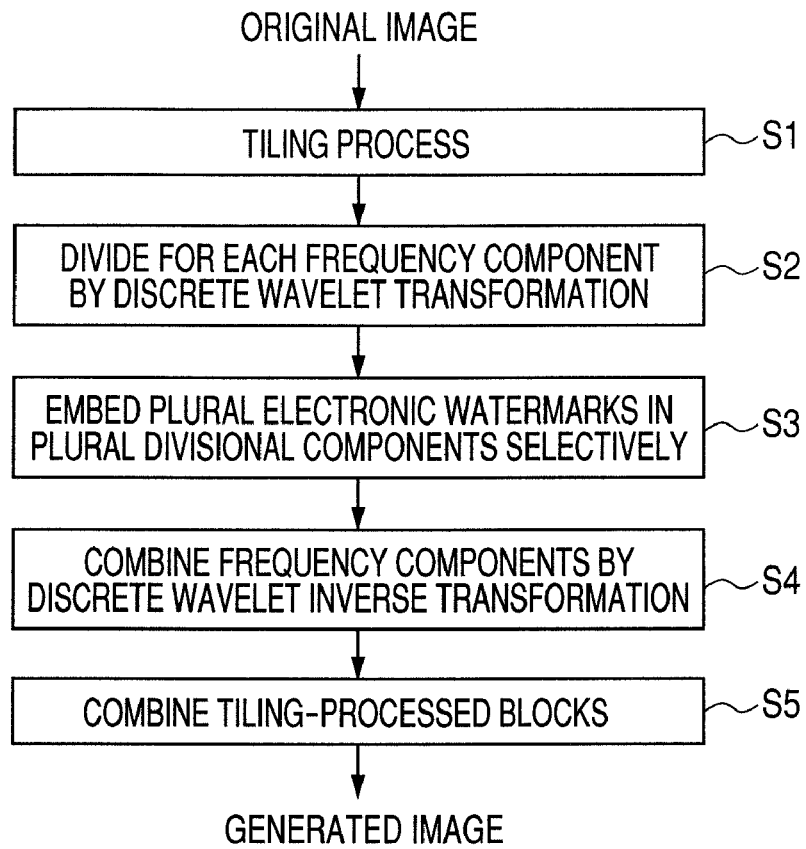
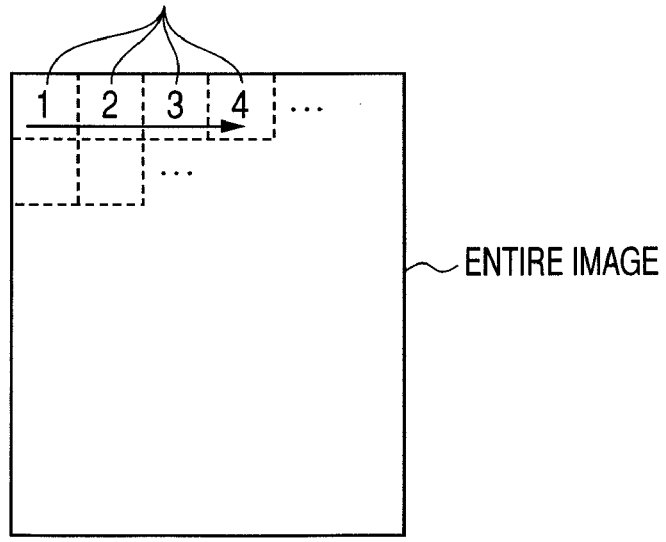

FIG. 9A 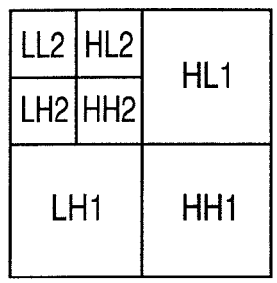 ⇒ FIG. 9B 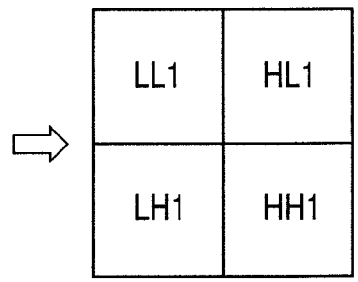 ⇒ FIG. 9C 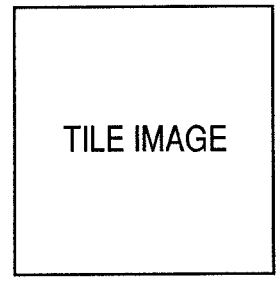
TWO-STAGE COMBINATION    ONE-STAGE COMBINATION
FIG. 10
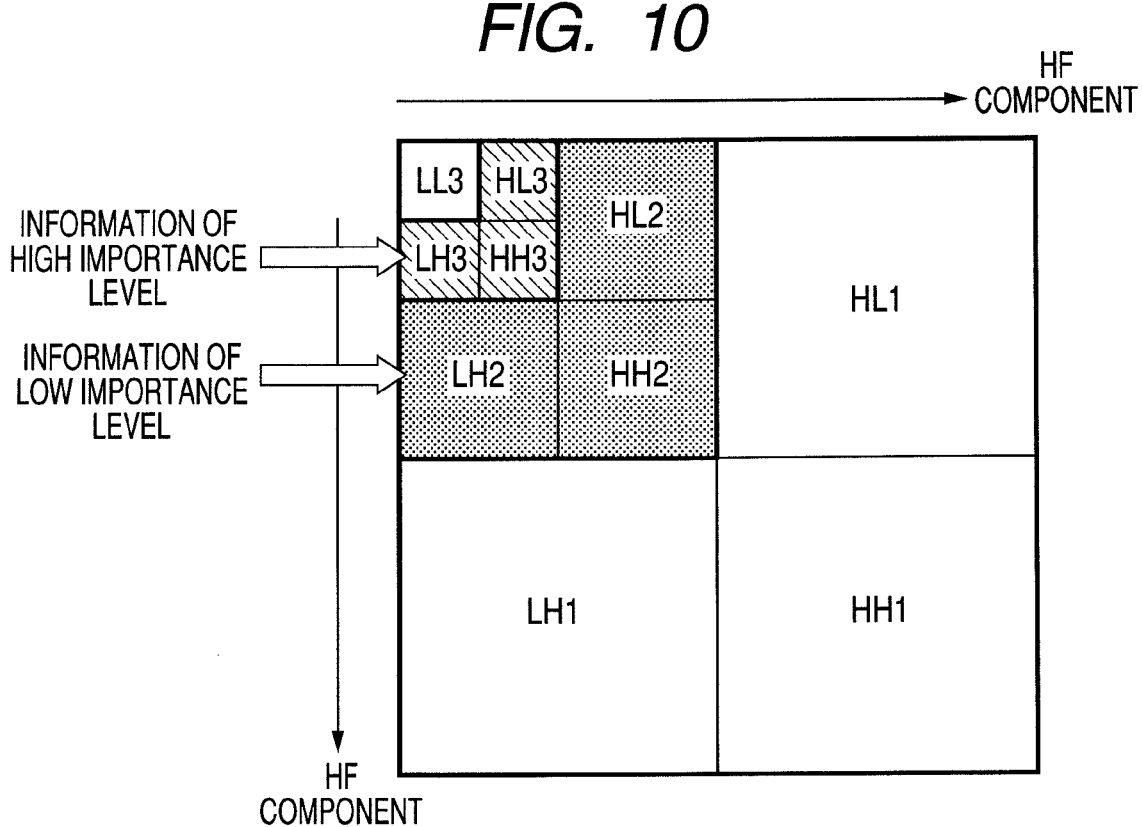

ELECTRONIC WATERMARK EMBEDDING APPARATUS FOR SELECTIVELY EMBEDDING ELECTRONIC WATERMARK INFORMATION IN DIFFERENT FREQUENCY COMPONENTS OF IMAGE DATA AND ELECTRONIC WATERMARK EMBEDDING METHOD

BACKGROUND OF THE INVENTION

1. Field of the Invention

The present invention relates to a control method of embedding an electronic watermark in image data of multi-valued gradation.

2. Description of the Related Art

In recent years, the prevalence of digital data has increased with the global spread of networks. In such a situation, electronic watermarks are watched from the point of view of copyright protection. The "electronic watermark" is a technique of embedding information in digital data so that a human being cannot perceive the information. By using the technique, copyright management of content data and the prevention of unjustified use thereof are performed.

By using the electronic watermark, the following information can be embedded in image data:

1. copyright information,
2. use regulation information (prohibition of copying, etc.),
3. owner indicating information,
4. historical management information of an inter protocol (IP) address,
5. data information (date and time, serial number, etc.), and
6. user designation information (user input information).

Various electronic watermark techniques have been proposed lest a human being should be able to perceive the electronic watermarks. A method of embedding an electronic watermark in low-order bits in a space area in which image data is configured is called a "space area type". A method of embedding an electronic watermark in the high frequency side of transformed data obtained by frequency transformation of image data is called a "transformation area type". These methods utilize the property of a human being such that the perception of the human being is sensitive in a low frequency band and is insensitive in a high frequency band.

However, the electronic watermark embedded in a low-order bit of image data or a high frequency band thereof is easily removed by the execution of a low pass filtering process and a smoothing process, and the electronic watermark has a weak resistance property. If the electronic watermark is removed in this manner, then the deterrent force of the unjustified use is gone in the case of using the electronic watermark for the purpose of copyright protection.

A method of embedding an electronic watermark into the frequency components important for the perception of a human being for the compensation of the weak resistance property has been proposed (see, for example, Japanese Patent Application Laid-Open No. H09-191394). Because the method embeds the electronic watermark by spectrum spreading, the watermark itself is recognized as additional random noises.

However, the method proposed in the Japanese Patent Application Laid-Open No. H09-191394 has a problem of image quality deterioration because the electronic watermark is embedded in the frequency components important for the perception of a human being.

As described above, the conventional techniques have the problems of the weak resistance property in the case of embedding the electronic watermark so as to reduce the image quality deterioration and of the increase of the image quality deterioration in the case of embedding the electronic watermark so as to strengthen the resistance property. That is, the conventional techniques have the problem that the improvement of the resistance property of the electronic watermark and the prevention of the quality deterioration are mutually exclusive.

SUMMARY OF THE INVENTION

It is an object of the present invention to provide an electronic watermark embedding apparatus and an electronic watermark embedding method, both capable of coping with both of the improvement of the resistance property of an electronic watermark and the prevention of image quality deterioration.

An aspect of the present invention embeds electronic watermark information having a high importance level in a component having a strong resistance property, and embeds electronic watermark information having a low importance level in a component exerting little influence on an image quality. As a result, the electronic watermark information to be embedded in the component having the strong resistance property is limited to the important information. Thus the aspect of the present invention aims to provide an apparatus that can suppress the image quality deterioration in comparison with the case of embedding all pieces of information in a component having a strong resistance property, with the apparatus embedding the electronic watermark information of the low importance level in the component exerting little influence on the image quality despite having a weak resistance property.

Further features of the present invention will become apparent from the following description of exemplary embodiments with reference to the attached drawings.

BRIEF DESCRIPTION OF THE DRAWINGS

FIG. 1 is a block diagram illustrating an image processing apparatus PR1 of a first exemplary embodiment of the present invention.

FIG. 2 is a block diagram illustrating an electronic watermark processing unit 207 of the present invention.

FIG. 3 is a flow chart illustrating a process of embedding an electronic watermark in image data in the first exemplary embodiment.

FIG. 4 is a view for describing a tiling process in the first exemplary embodiment.

FIGS. 9A, 9B and 9C are block diagrams for describing the function of combining hierarchical frequency components by the discrete wavelet inverse transformation unit 208.

FIG. 10 is a diagram for describing a method of embedding a plurality of pieces of electronic watermark information, which method is an application example of the first exemplary embodiment.

DESCRIPTION OF THE EMBODIMENTS

Figure 5:
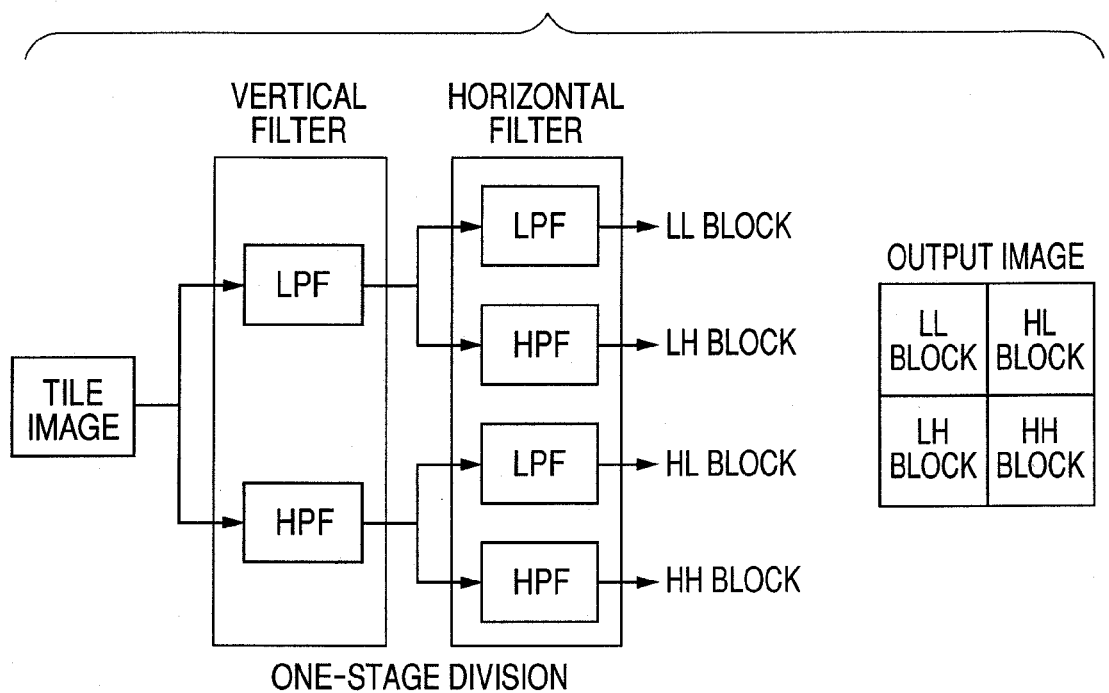
FIG. 5 is a block diagram for describing the function of dividing a frequency component by a discrete wavelet transformation unit 206.

Exemplary embodiments of the present invention will now be described in detail in accordance with the accompanying drawings.

FIG. 2 is a block diagram illustrating an electronic watermark processing unit 207 (see FIG. 1) of the present invention.

The electronic watermark processing unit 207 includes a dividing unit 101, electronic watermark embedding units 102 and 103, and a combining unit 104.

The dividing unit 101 is a unit for dividing image data into each component.

Each of the electronic watermark embedding units 102 and 103 is a unit for embedding an electronic watermark in a component selected from the data divided by the dividing unit 101.

The combining unit 104 is a unit for combining the divided data.

When image data is input into the dividing unit 101, the input image data is divided into a plurality of components. Examples of a division based on frequency components and a division based on a bit hierarchy in a space area will be described later.

When an electronic watermark is embedded in divided data, some components have strong resistance properties, and some components exert little influence on an image quality depending on their features. The component in which an electronic watermark is embedded is selected on the basis of these features, and the electronic watermark is embedded in the selected component.

When the component of the embedding object is selected, the following determination method is conceivable.

As described with regard to the background technique, various kinds of electronic watermark information exist. The various kinds of electronic watermark information have mutually different essentiality according to the content of information.

For example, as to "1. copyright information", the information is necessary as long as an image exists. On the other hand, as to "5. data information (date and time, serial number, etc.)", the information is useful for the management of information, but the information can be also determined to have a lower importance level than that of the "1. copyright information". On the basis of the content of such electronic watermark information, the information of a high importance level is embedded in a component having a strong resistance property, and the information of a low importance level is embedded in a component exerting little influence on an image quality.

Although two pieces of electronic watermark information are illustrated in the electronic watermark processing unit 207 illustrated in FIG. 2, three or more electronic watermark embedding units may be provided, and three or more pieces of electronic watermark information may exist. It is not necessary to provide a piece of electronic watermark information to an electronic watermark embedding unit, and various combination patterns are conceivable as the occasion demands.

Moreover, as the information to be embedded in a component having a strong resistance property, the information concerning security (crime prevention) is conceivable. For example, if the "1. copyright information", which indicates the protection of a copyright, and the "2. use regulation information", which indicates the prohibition of copying or the limitation of copying, are used as the information to be embedded in a component having a strong resistance property, then the embedding is effective.

The combining unit 104 combines the data including an embedded electronic watermark with the data receiving no processing among the pieces of divided data. As a result, the data including embedded electronic watermark is generated.

Concrete configuration examples will be given in the following exemplary embodiments to be described.

First Exemplary Embodiment

FIG. 1 is a block diagram illustrating an image processing apparatus PR1 of a first exemplary embodiment of the present invention.

The image processing apparatus PR1 of the first exemplary embodiment is an apparatus for dividing image data into frequency components by the use of a discrete wavelet transformation to embed an electronic watermark in the image data.

The image processing apparatus PR1 includes a central processing unit (CPU) 201, a read only memory (ROM) 202, a random access memory (RAM) 203, an electrically erasable, programmable read-only memory (EEPROM) 204, a user interface unit 205, a discrete wavelet transformation unit 206, the electronic watermark processing unit 207, and a discrete wavelet inverse transformation unit 208.

The CPU 201 controls the image processing apparatus PR1. The ROM 202 stores programs for controlling the image processing apparatus PR1. The RAM 203 is a data readable and writable memory. The EEPROM 204 is a memory capable of holding data even when the power source thereof is intercepted.

The user interface unit 205 communicates with external equipment of the apparatus PR1. The discrete wavelet transformation unit 206 performs the discrete wavelet transformation of image data.

FIG. 2 is a block diagram illustrating the electronic watermark processing unit 207.

The electronic watermark processing unit 207 performs an embedding process of an electronic watermark. The discrete wavelet inverse transformation unit 208 executes a discrete wavelet inverse transformation of image data.

FIG. 3 is a flow chart illustrating the embedding process of an electronic watermark in image data in the first exemplary embodiment.

At Step S1, an original image is divided into rectangular areas. The process of dividing the original image into the rectangular areas is called as a "tiling process". At Step S2, the tiling-processed image is transformed by the discrete wavelet transformation to be divided to each frequency component. At Step S3, a plurality of pieces of electronic watermark information is selectively embedded in the data divided to each frequency component. At Step S4, the discrete wavelet inverse transformation is performed to the image to combine the frequency components. At Step S5, the tiling-processed blocks are combined.

Next, the details of each of the processes are described.

FIG. 4 is a view for describing the tiling process in the first exemplary embodiment.

In FIG. 4, a rectangle illustrated by a solid line illustrates the whole image. Blocks illustrated by broken lines illustrate embedding process areas in which an electronic watermark is embedded. In this manner, the image is processed by being divided into the sizes in which the electronic watermark embedding process can be performed. The images in the tiled individual rectangular areas are called as "tile images". The process of the discrete wavelet transformation is executed in conformity with the order of the numerals entered in the view.

FIG. 5 is a block diagram for describing the function of dividing a frequency component by the discrete wavelet transformation unit 206.

In FIG. 5, a tile image is divided into a high frequency component and a low frequency component by means of a high pass filter and a low pass filter, respectively, in the vertical direction of the tile image. Next, each of the image data divided in the vertical direction is divided into the data of a high frequency component and the data of a low frequency component in the horizontal direction of the tile image by means of a high pass filter and a low pass filter, respectively.

As a result of the above-mentioned process, an output image illustrated in FIG. 5 can be obtained. The process is called as "one-stage division".

In the output image, a component LL is a low frequency component in both of the vertical direction and the horizontal direction. Moreover, components HH, HL, and LH are components including a frequency component in at least one of the vertical direction and the horizontal direction.

Figure 6A:
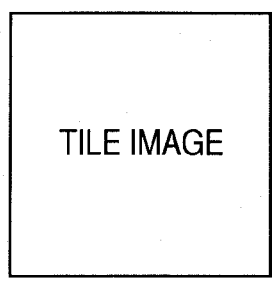
FIGS. 6A, 6B and 6C are block diagrams for describing the function of dividing a hierarchical frequency component by the discrete wavelet transformation unit 206.
Figure 6B:
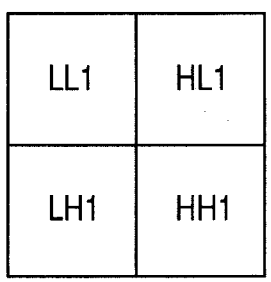
Figure 6C:
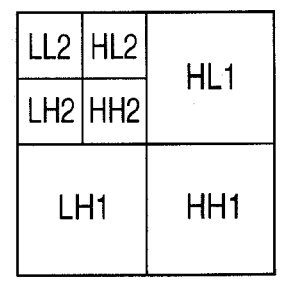

FIGS. 6A, 6B and 6C are block diagrams for describing the function of dividing a hierarchical frequency component by the discrete wavelet transformation unit 206.

The operation from FIG. 6A to FIG. 6B is the operation of the one-stage division described with regard to FIG. 5. When this process is performed to a low frequency component LL1 in FIG. 6B, a result illustrated in FIG. 6C is obtained. The operation is called as "two-stage division". As a result, the frequency component is divided into high frequency components HH1, HL1, and LH1, second high frequency components HH2, HL2, and LH2, and a low frequency component LL2.

Figure 7:
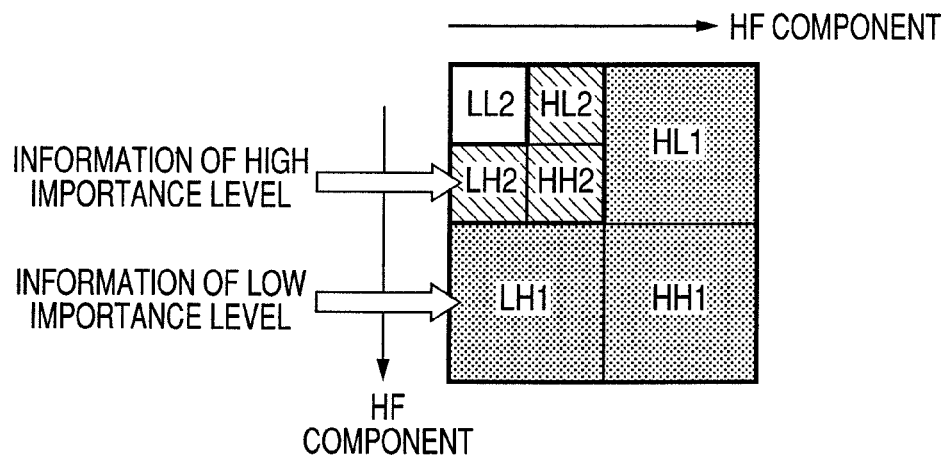
FIG. 7 is a diagram for describing a method of embedding a plurality of pieces of electronic watermark information in the first exemplary embodiment.

FIG. 7 is a diagram for describing a method of embedding a plurality of pieces of electronic watermark information in the first exemplary embodiment.

In FIG. 7, the high frequency components HH1, HL1, and LH1 are the ones having the highest frequencies. If an electronic watermark is embedded in the high frequency components HH1, HL1, and LH1, then the embedding in which the resistance property of the electronic watermark is weak but the deterioration of the image quality is little can be performed.

Accordingly, the electronic watermark information of a low importance level is embedded in the high frequency components HH1, HL1, and LH1.

The second high frequency components HH2, HL2, and LH2 are the components having the highest frequencies next to the high frequency components HH1, HL1, and LH1. If an electronic watermark is embedded in the second high frequency components HH2, HL2, and LH2, then the influence on the image is stronger than that of the cases of the high frequency components HH1, HL1, and LH1 but the resistance property of the embedding of the electronic watermark is strong. Accordingly, the electronic watermark information of a high importance level is embedded in the second high frequency components HH2, HL2, and LH2.

If an electronic watermark is embedded in the low frequency component LL2, then the image is broken. Accordingly, no electronic watermarks are embedded in the low frequency component LL2.

Figure 8:
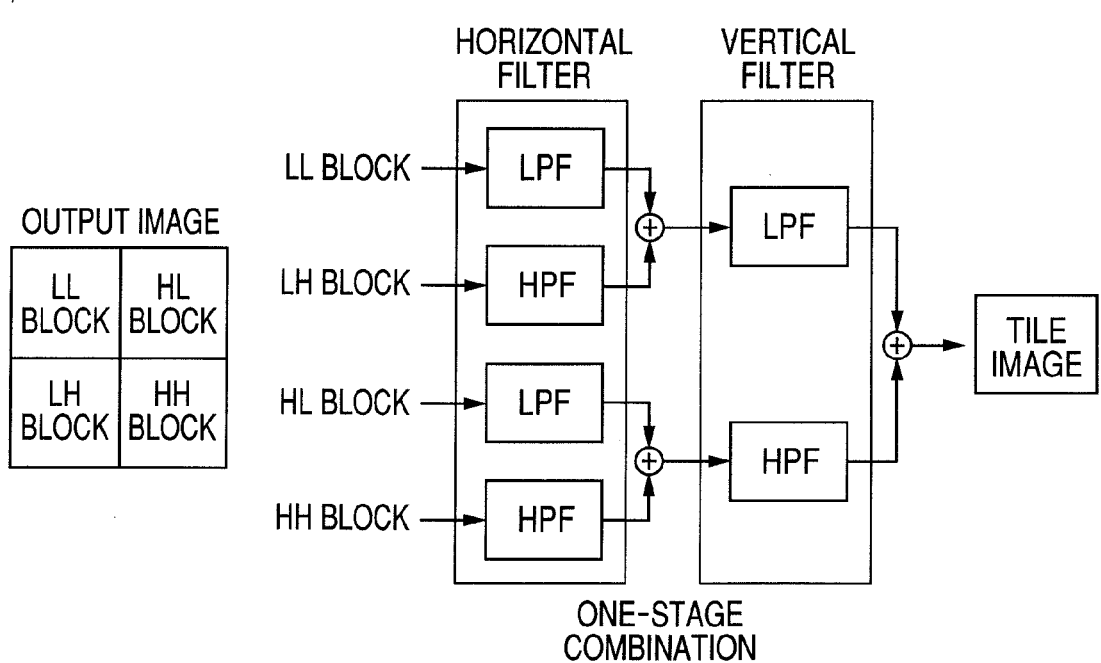
FIG. 8 is a block diagram for describing the function of combining frequency components by a discrete wavelet inverse transformation unit 208.

FIG. 8 is a block diagram for describing the function of combining the frequency components by the discrete wavelet inverse transformation unit 208.

In FIG. 8, the data of high frequency components and the data of low frequency components are combined in the horizontal direction to be an image by means of low pass filters and high pass filters. Next, images are combined in the vertical direction by means of a low pass filter and a high pass filter. The process is called as "one-stage combination".

FIGS. 9A, 9B and 9C are block diagrams for describing the function of combining hierarchical frequency components by the discrete wavelet inverse transformation unit 208.

The operation from FIG. 9A to FIG. 9B is the combination operation of the low frequency component LL2, and the second high frequency components HH2, HL2, and LH2, which operation has been described with reference to FIG. 8. The operation is called as "two-stage combination". The operation from FIG. 9B to FIG. 9C is the "one-stage combination" described with reference to FIG. 8, and the low frequency component LL1 and the high frequency components HH1, HL1, and LH1 are combined.

According to the first exemplary embodiment, a plurality of pieces of electronic watermark information can be selectively embedded in different components of image data.

Moreover, by embedding the electronic watermark information of a high importance level in a low frequency component (second high frequency component), electronic watermark embedding having a strong resistance property can be performed. On the other hand, by embedding the electronic watermark information of a low importance level in a high frequency component, electronic watermark embedding preventing image quality deterioration can be performed.

The first exemplary embodiment includes dedicated units such as the discrete wavelet transformation unit 206, the electronic watermark processing unit 207, and the discrete wavelet inverse transformation unit 208, illustrated in FIG. 1. Incidentally, the functions of the discrete wavelet transformation unit 206, the electronic watermark processing unit 207, and the discrete wavelet inverse transformation unit 208 may be controlled by the control of the CPU 201 in conformity with software.

Application Example of First Exemplary Embodiment

The first exemplary embodiment embeds an electronic watermark in the highest frequency components and the next highest frequency components. As an application example of the first exemplary embodiment, flexible electronic watermark embedding capable of coping with both of the resistance property and the image quality is conceivable.

FIG. 10 is a diagram for describing a method of embedding a plurality of pieces of electronic watermark information, which method is the application example of the first exemplary embodiment.

Three-stage division of a tile image is performed, and four stages of frequency division are performed. The high frequency components HH1, HL1, and LH1 are components having the highest frequencies. The second high frequency components HH2, HL2, and LH2 are the frequency components having the highest frequencies next to those of the high frequency components HH1, HL1, and LH1. Third high frequency components HH3, HL3, and LH3 are the frequency components having the highest frequencies next to those of the second high frequency components HH2, HL2, and LH2. A low frequency component LL3 is a frequency component having the lowest frequency.

The electronic watermark information demanding a strong resistance property is embedded in the third high frequency components HH3, HL3, and LH3. The electronic watermark information not demanding the strong resistance property is embedded in the high frequency components HH1, HL1, and LH1. That is, the example illustrated in FIG. 10 is an example of embedding the information of a high importance level in the third high frequency components HH3, HL3, and LH3, and embedding the information of a low importance level in the second high frequency components HH2, HL2, and LH2.

Second Exemplary Embodiment

Figure 11:
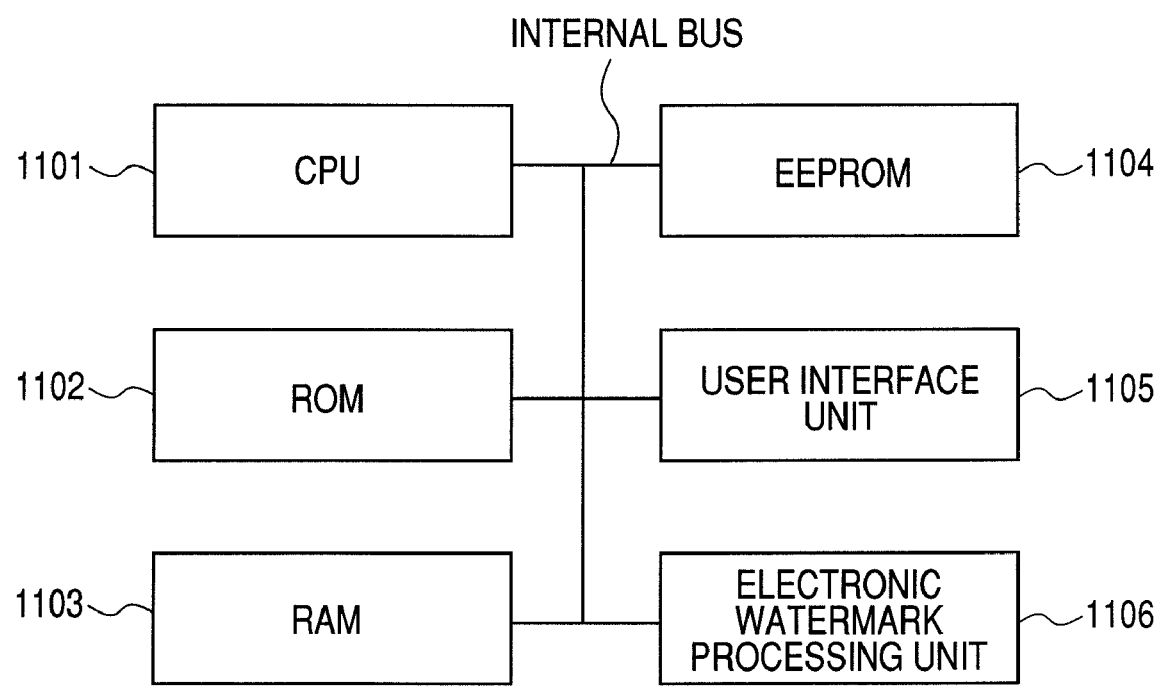
FIG. 11 is a block diagram illustrating an image processing apparatus PR2 of a second exemplary embodiment of the present invention.

FIG. 11 is a block diagram illustrating an image processing apparatus PR2 of a second exemplary embodiment of the present invention.

The first exemplary embodiment is the one executing each unit in a separated block. The second exemplary embodiment is the one executing the whole process thereof in one block.

The image processing apparatus PR2 includes a CPU 1101, a ROM 1102, a RAM 1103, an EEPROM 1104, a user interface unit 1105, and an electronic watermark processing unit 1106.

The CPU 1101 controls the image processing apparatus PR2. The ROM 1102 stores programs for controlling the image processing apparatus PR2. The RAM 1103 is a data readable and writable memory.

The EEPROM 1104 can hold data even when the power source thereof is intercepted. The user interface unit 1105 communicates with external equipment of the apparatus PR2. The electronic watermark processing unit 1106 performs the process of embedding an electronic watermark.

Figure 12:
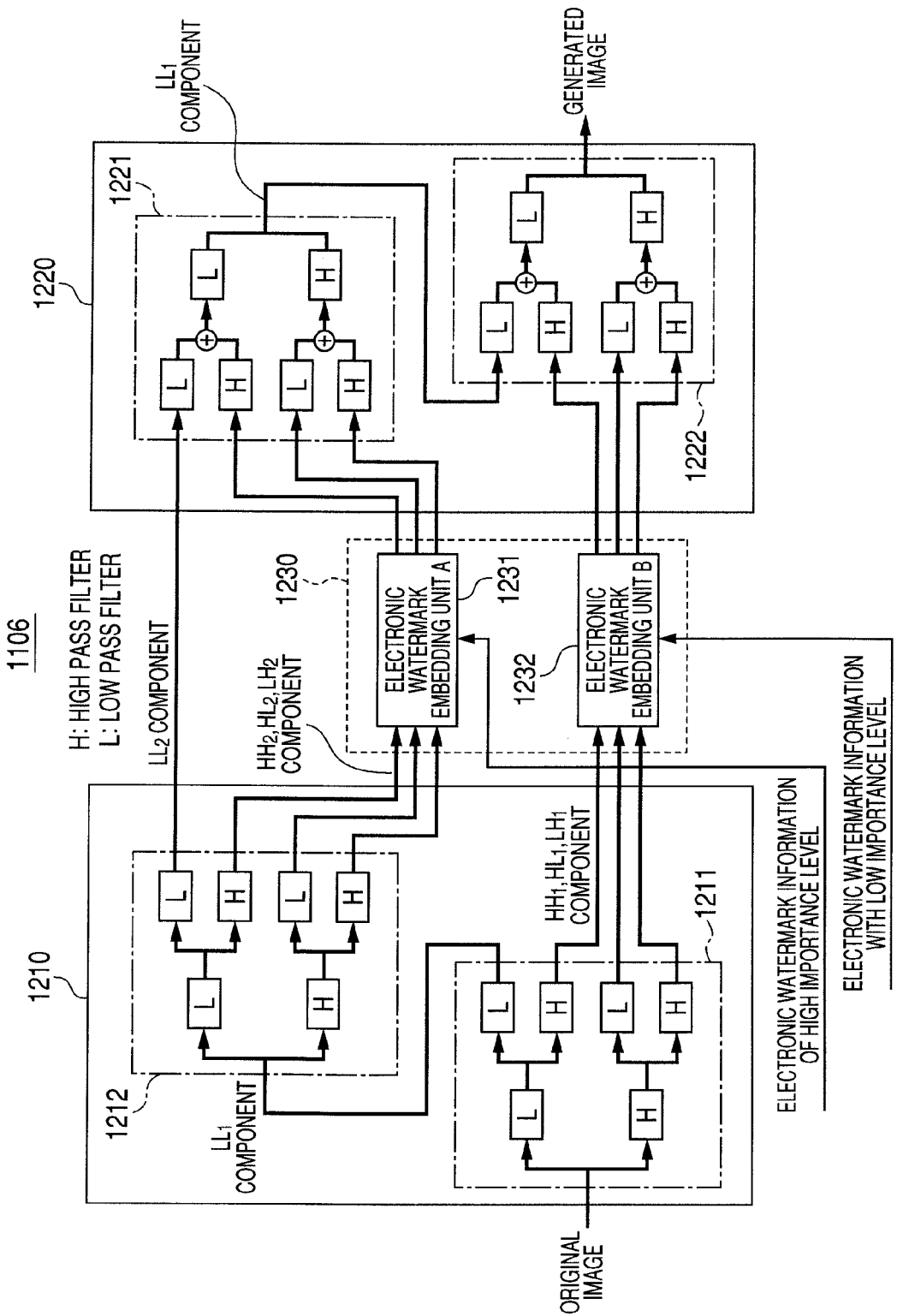
FIG. 12 is a configuration diagram illustrating an electronic watermark processing unit 1106 in the second exemplary embodiment.

FIG. 12 is a configuration diagram illustrating the electronic watermark processing unit 1106 in the second exemplary embodiment.

In the electronic watermark processing unit 1106, a discrete wavelet transformation unit 1210, a one-stage division unit 1211, a two-stage division unit 1212, a discrete wavelet inverse transformation unit 1220, a two-stage combination unit 1221, and a one-stage combination unit 1222 are provided.

An electronic watermark executing unit 1230 includes electronic watermark embedding units 1231 and 1232. The electronic watermark embedding units 1231 and 1232 are distinguished by additional marks A and B.

When an original image is input, the one-stage division unit 1211 performs the one-stage division of the discrete wavelet transformation. The high frequency components HH1, HL1, and LH1 are transmitted to the electronic watermark embedding unit B 1232. The low frequency component LL1 is transmitted to the two-stage division unit 1212. When the low frequency component LL1 is input, the two-stage division unit 1212 performs the one-stage division of the discrete wavelet transformation. The second high frequency components HH2, HL2, and LH2 are transmitted to the electronic watermark embedding unit A 1231. The low frequency component LL2 is transmitted to the two-stage combination unit 1221.

An electronic watermark of a low importance level is embedded in the high frequency components HH1, HL1, and LH1 transmitted to the electronic watermark embedding unit B 1232. The data including the embedded electronic watermark is transmitted to the one-stage combination unit 1222.

An electronic watermark of a high importance level is embedded in the second high frequency components HH2, HL2, and LH2 transmitted to the electronic watermark embedding unit A 1231. The data including the embedded electronic watermark is transmitted to the two-stage combination unit 1221.

The two-stage combination unit 1221 performs the two-stage combination of the discrete wavelet transformation of the low frequency component LL2 transmitted from the two-stage division unit 1212 and the second high frequency components HH2, HL2, and LH2 transmitted from the electronic watermark embedding unit A 1231. The synthesized low frequency component LL1 is transmitted to the one-stage combination unit 1222. The one-stage combination unit 1222 performs the one-stage combination of the discrete wavelet transformation of the low frequency component LL1 transmitted from the two-stage combination unit 1221 and the high frequency components HH1, HL1, and LH1 transmitted from the electronic watermark embedding unit B 1232.

As a result of the execution of the above-mentioned process, a generated image including an embedded electronic watermark is output.

The process of the second exemplary embodiment brings about the results equal to those of the process of the first exemplary embodiment. Furthermore, since the second exemplary embodiment does not require the control between process flows, the processing speed thereof is improved.

Third Exemplary Embodiment

Figure 13:
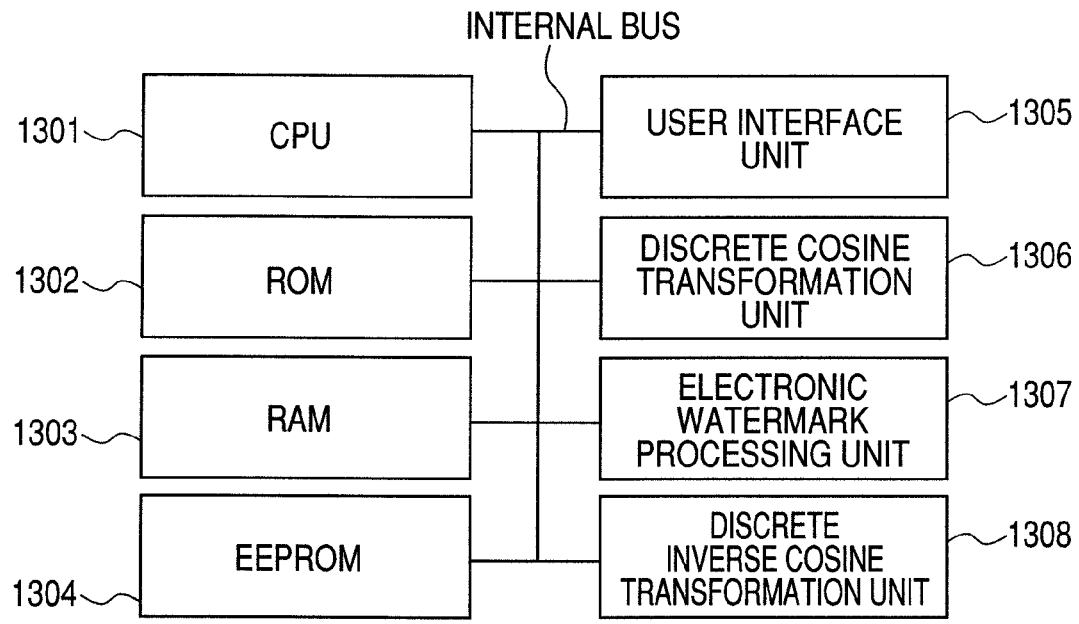
FIG. 13 is a block diagram illustrating an image processing apparatus PR3 of a third exemplary embodiment of the present invention.

FIG. 13 is a block diagram illustrating an image processing apparatus PR3 of a third exemplary embodiment of the present invention.

The third exemplary embodiment is the one dividing image data into frequency components by the use of a discrete cosine transformation to embed a watermark.

The image processing apparatus PR3 includes a CPU 1301, a ROM 1302, a RAM 1303, an EEPROM 1304, a user interface unit 1305, a discrete cosine transformation unit 1306, an electronic watermark processing unit 1307, and a discrete inverse cosine transformation unit 1308.

The CPU 201 controls the image processing apparatus PR3. The ROM 1302 stores programs for controlling the image processing apparatus PR3. The RAM 1303 is a data readable and writable memory. The EEPROM 1304 is a memory capable of holding data even when the power source thereof is intercepted.

The user interface unit 1305 communicates with external equipment of the apparatus PR3. The discrete cosine transformation unit 1306 performs the discrete cosine transformation of image data. The electronic watermark processing unit 1307 performs an embedding process of an electronic watermark. The discrete inverse cosine transformation unit 1308 executes a discrete cosine inverse transformation of image data.

Figure 14:
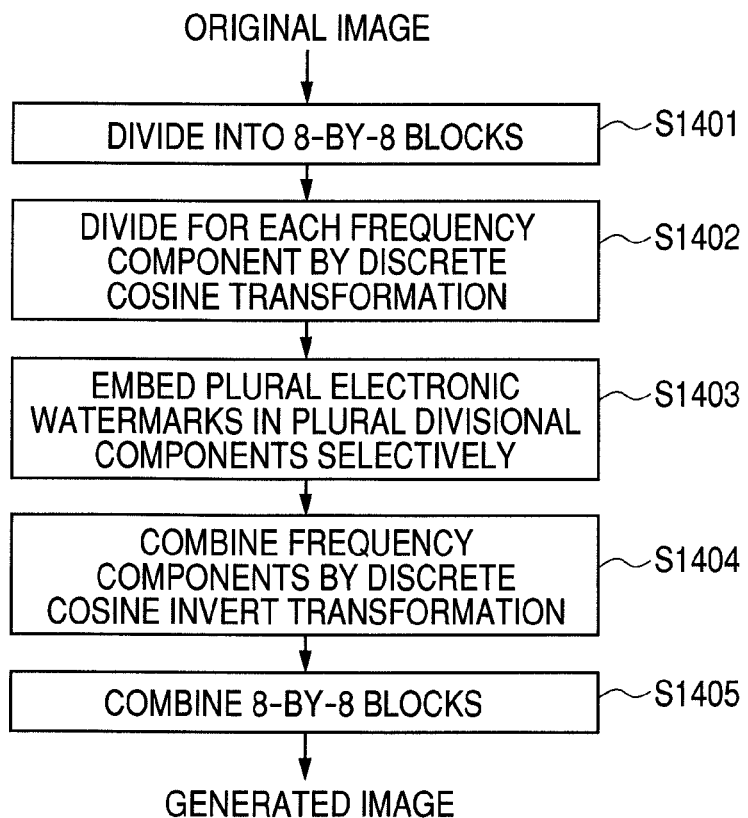
FIG. 14 is a flow chart illustrating the process of embedding an electronic watermark in image data in the third exemplary embodiment.

FIG. 14 is a flow chart illustrating the embedding process of an electronic watermark in image data in the third exemplary embodiment.

At Step S1401, an original image is divided into 8-by-8 blocks. At Step S1402, the divided blocks are transformed by the discrete cosine transformation to be divided to each frequency component. At Step S1403, a plurality of pieces of electronic watermark information is selectively embedded in the data divided to each frequency component. At Step S1404, the discrete cosine inverse transformation is performed to the blocks to combine the frequency components. At Step S1405, the 8-by-8 blocks are combined.

Figure 15:
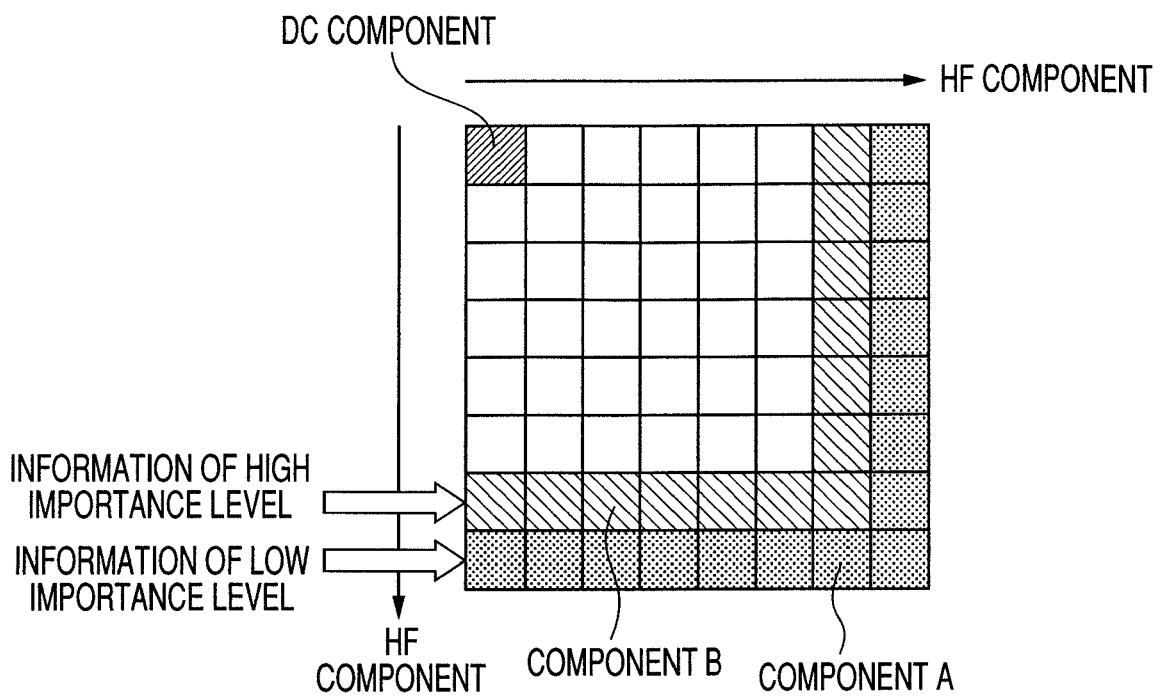
FIG. 15 is a block diagram for describing the function of dividing a frequency component by a discrete cosine transformation unit 1306.

FIG. 15 is a block diagram for describing the function of dividing a frequency component by the discrete cosine transformation unit 1306.

In FIG. 15, a pixel at the top left corner is a direct-current component. The other pixels are alternating current components. Blocks on the more right sides and more under sides are higher frequency components. Frequency components A illustrated by dot patterns on the most right side and the most under side are the components having the highest frequencies. If an electronic watermark is embedded in the high frequency components, then the resistance property of the embedded electronic watermark is weak, but the deterioration of the image quality thereof is little. Accordingly, the electronic watermark information of a low importance level is embedded in the highest frequency components.

Electronic watermark embedding exerting influence on an image but having a strong resistance property can be performed in the secondary highest frequency components (second high frequency), or the components B. Accordingly the electronic watermark information of a high importance level is embedded in the second high frequency components B.

As described above, a plurality of pieces of electronic watermark information can be selectively embedded in different frequency components in image data by the configuration of the third exemplary embodiment.

Moreover, by embedding the electronic watermark information of a high importance level in a low frequency component, electronic watermark embedding having a strong resistance property can be performed. On the other hand, by embedding the electronic watermark information of a low importance level in a high frequency component, electronic watermark embedding preventing image quality deterioration can be performed.

Application Example of Third Exemplary Embodiment

The third exemplary embodiment embeds an electronic watermark in the highest frequency components and the next highest frequency components. As described in the application example of the first exemplary embodiment, an application example realizing the flexible electronic watermark embedding capable of coping with both of the strong resistance property and a high image quality is conceivable also in the third exemplary embodiment.

Figure 16:
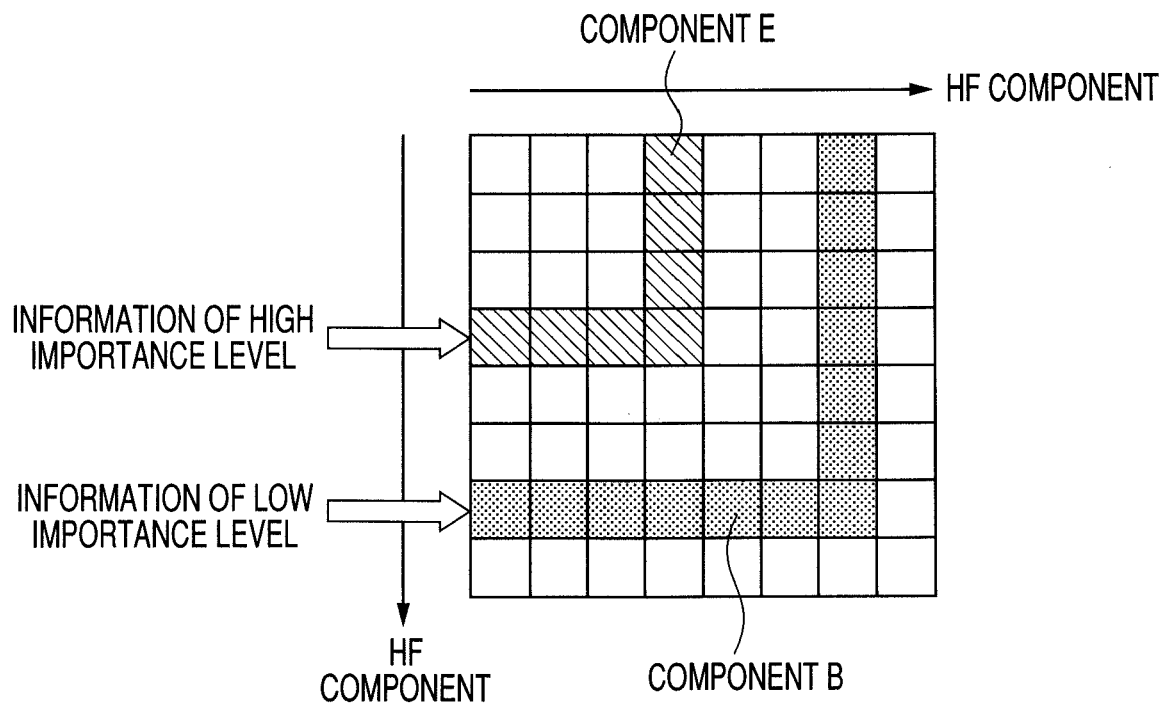
FIG. 16 is a diagram for describing a method of embedding a plurality of pieces of electronic watermark information in an application example of the third exemplary embodiment.

FIG. 16 is a diagram for describing a method of embedding a plurality of pieces of electronic watermark information in the application example of the third exemplary embodiment.

The application example of the third exemplary embodiment is the one embedding electronic watermark information of a higher importance level and of requiring a stronger resistance property in the lower frequency components than those of the third exemplary embodiment. In FIG. 16, the information of a high importance level is embedded in frequency components E, and the information of a low importance level is embedded in frequency components B.

Fourth Exemplary Embodiment

Figure 17:
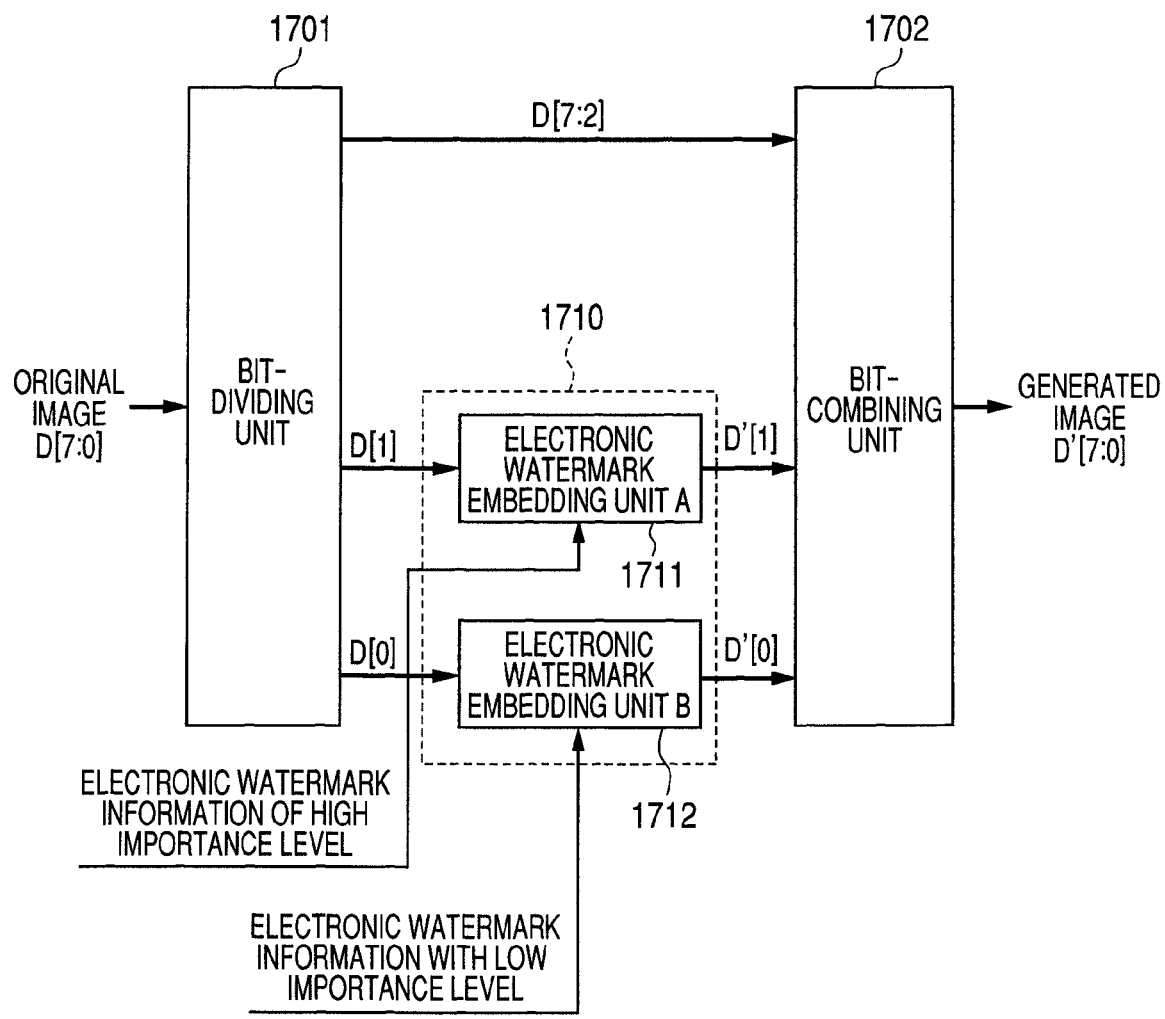
FIG. 17 is a block diagram illustrating an electronic watermark processing unit in an image processing apparatus PR4 of a fourth exemplary embodiment of the present invention.

FIG. 17 is a block diagram illustrating an electronic watermark processing unit in an image processing apparatus PR4 of a fourth exemplary embodiment of the present invention.

The fourth exemplary embodiment of the present invention is the one dividing image data to a bit hierarchy of a space area to embed an electronic watermark therein. The configuration of the image processing apparatus PR4, which is the fourth exemplary embodiment, is the same as that of the image processing apparatus PR2 illustrated in FIG. 11.

The image processing apparatus PR4 includes a bit-dividing unit 1701, a bit-combining unit 1702, and electronic watermark embedding unit 1710.

The bit-dividing unit 1701 performs the bit division of image data. The bit-combining unit 1702 combines the bit-divided data.

The electronic watermark processing unit 1710 executes electronic watermark embedding, and includes an electronic watermark embedding unit A 1711 and an electronic watermark embedding unit B 1712.

Original image data is expressed as D[7:0]. The data includes the highest order bit (most significant bit) D[7] and the lowest order bit (least significant bit) D[0].

When the original image D[7:0] is input, the bit-dividing unit 1701 divides the input original image D[7:0] into image data D[7:2], image data D[1], and image data D[0].

The image data D[7:2] is transmitted to the bit-combining unit 1702. On the other hand, the image data D[1] is transmitted to the electronic watermark embedding unit A 1711. Moreover, the image data D[0] is transmitted to the electronic watermark embedding unit B 1712. The electronic watermark embedding unit A 1711 embeds an electronic watermark of a high importance level in the image data D[1]. The embedded data output from the electronic watermark embedding unit A 1711 is denoted by D' [1]. The electronic watermark embedding unit B 1712 embeds an electronic watermark of a low importance level in the image data D[0]. The embedded data output from the electronic watermark embedding unit B 1712 is dented by D' [0]. The bit-dividing unit 1701 performs the bit combination of the data D[7:2], D'[1], and D' [0], and outputs a generated image D'[7:0].

Figure 18:
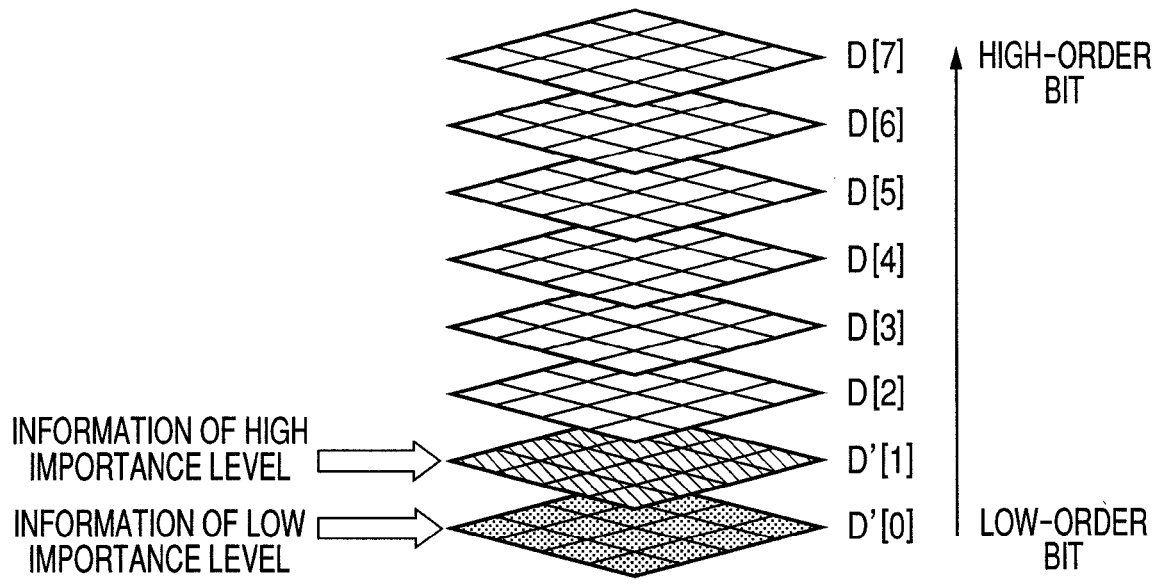
FIG. 18 is a view illustrating the space area of a generated image expressed by a bit hierarchy in the fourth exemplary embodiment.

FIG. 18 is a view illustrating the space area of the generated image D'[7:0] expressed by a bit hierarchy in the fourth exemplary embodiment.

As illustrated in FIG. 18, high-order bits are arranged in the upper part, and low-order bits are arranged in downward directions.

By the process of the electronic watermark processing unit described with reference to FIG. 17, the electronic watermark information of a low importance level is embedded in the data D' [0] in the lowest order bit layer. Then, the electronic watermark information of a high importance level is embedded in the data D'[1] in the next lowest order bit layer.

As described above, according to the fourth exemplary embodiment, a plurality of pieces of electronic watermark information can be selectively embedded in different components of image data.

Moreover, since the electronic watermark information of a high importance level is embedded in a high-order bit hierarchy, the electronic watermark embedding having a strong resistance property can be realized. On the other hand, since the electronic watermark information of a low importance level is embedded in the lowest order bits, the electronic watermark embedding preventing image quality deterioration can be realized.

Application Example of Fourth Exemplary Embodiment

Figure 19:
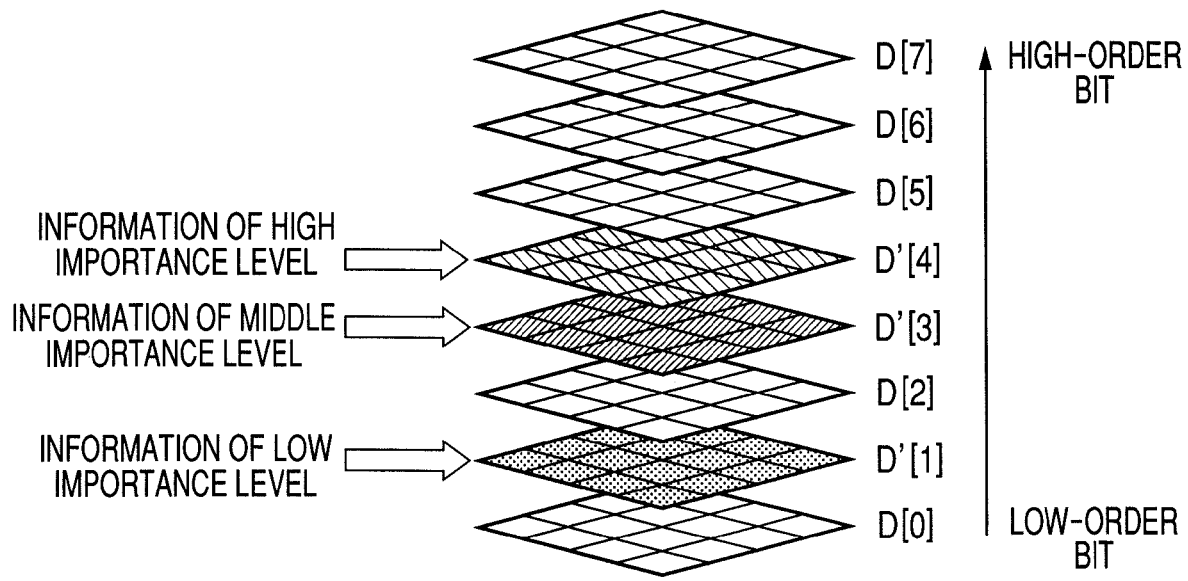
FIG. 19 is view illustrating the space area of a generated image expressed by the bit hierarchy in an application example of the fourth exemplary embodiment.

FIG. 19 is a view illustrating the space area of a generated image expressed by a bit hierarchy in an application example of the fourth exemplary embodiment.

The fourth exemplary embodiment is the one embedding an electronic watermark in the lowest order bits and the next lowest order bits. The application example of the fourth exemplary embodiment is a flexible electronic watermark embedding method capable of coping with both of a strong resistance property and a high image quality.

Similarly to the description with regard to FIG. 18, high-order bits are arranged in the upper part, and low-order bits are arranged in downward directions.

Three pieces of information is embedded as electronic watermark information in the application example of the fourth exemplary embodiment. That is, the electronic watermark information of a higher importance level which information demands a stronger resistance property is embedded in higher order bits than that of the fourth exemplary embodiment. The application example illustrated in FIG. 19 embeds the electronic watermark information of a high importance level in image data D'[4], embeds the electronic watermark information of a middle importance level in image data D'[3], and embeds the electronic watermark information of a low importance level in image data D'[1]

Incidentally the exemplary embodiments may be applied to moving image data or sound data.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-244939, filed Sep. 21, 2007, which is hereby incorporated by reference herein in its entirety.

What is claimed is:

1. An electronic watermark embedding method for embedding an electronic watermark in image data of multi-valued gradation, said method comprising the steps of:
dividing image data into a plurality of frequency components that are different in frequency from each other, and
selectively embedding a plurality of pieces of electronic watermark information that are different in kind from each other into respective frequency components that are different in frequency and importance level from each other,
wherein in said embedding step, the electronic watermark information of low importance level is selectively embedded into a higher-frequency one of the frequency components, and the electronic watermark information of high importance level is selectively embedded into a lower-frequency one of the frequency components used for embedding.

2. An electronic watermark embedding method according to claim 1, wherein in said dividing step, the image data is subjected to frequency transformation, and in said embedding step, the plurality of pieces of electronic watermark information that are different in kind from each other are selectively embedded into mutually different frequency components.

3. An electronic watermark embedding method according to claim 2, wherein the frequency transformation is discrete cosine transformation.

4. An electronic watermark embedding method according to claim 2, wherein the frequency transformation is discrete wavelet transformation.

5. An electronic watermark embedding method according to claim 1, wherein in said embedding step, the electronic watermark information of low importance level is selectively embedded into the highest-frequency one of the frequency components, and the electronic watermark information of high importance level is selectively embedded into the lowest-frequency one of the frequency components used for embedding.

6. An electronic watermark embedding method according to claim 1, wherein in said embedding step, the electronic watermark information is selectively embedded in a low-to-high order of importance level thereof into, respectively, frequency components in a high-to-low order of frequency thereof.

7. An electronic watermark embedding apparatus for embedding an electronic watermark in image data of multi-valued gradation, said apparatus comprising:
a dividing unit which divides image data into a plurality of frequency components that are different in frequency from each other, and
an embedding unit which selectively embeds a plurality of pieces of electronic watermark information that are different in kind from each other into respective frequency components that are different in frequency and importance level from each other,
wherein said embedding unit selectively embeds the electronic watermark information of low importance level into a higher-frequency one of the frequency components and embeds the electronic watermark information of high importance level into a lower-frequency one of the frequency components used for embedding.

8. An electronic watermark embedding apparatus according to claim 7, wherein in said dividing unit, the image data is subjected to frequency transformation, and in said embedding unit, the plurality of pieces of electronic watermark information different in kind from each other are selectively embedded into mutually different frequency components.

9. An electronic watermark embedding apparatus according to claim 8, wherein the frequency transformation is discrete cosine transformation.

10. An electronic watermark embedding apparatus according to claim 8, wherein the frequency transformation is discrete wavelet transformation.

11. An electronic watermark embedding apparatus according to claim 7, wherein said embedding unit selectively embeds the electronic watermark information of low importance level into the highest-frequency one of the frequency components and embeds the electronic watermark information of high importance level into the lowest-frequency one of the frequency components among the frequency components used for embedding.

12. An electronic watermark embedding apparatus according to claim 7, wherein in said embedding step, the electronic watermark information is selectively embedded in a low-to-high order of importance level thereof into, respectively, frequency components in a high-to-low order of frequency thereof.

* * * * *